2,822,783

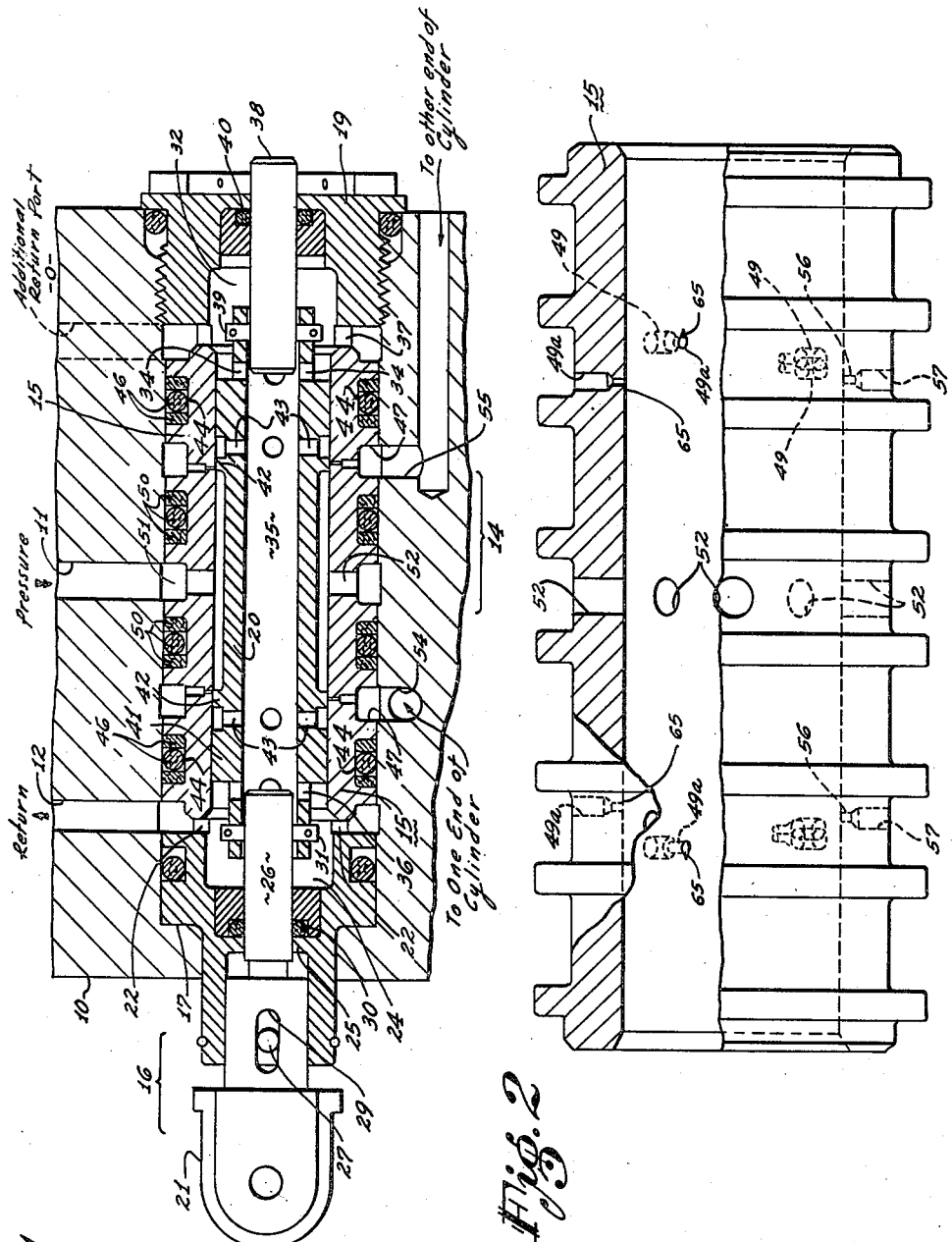

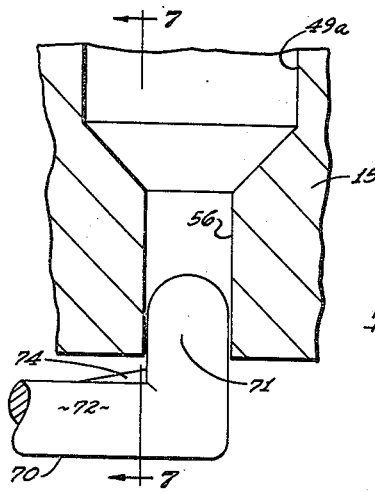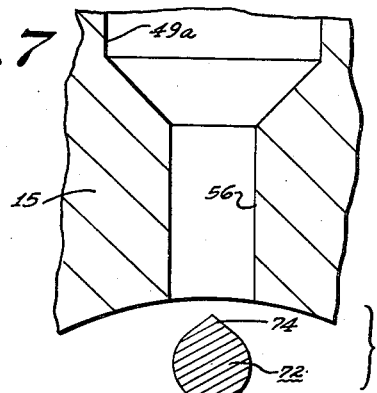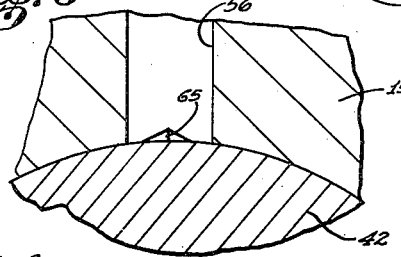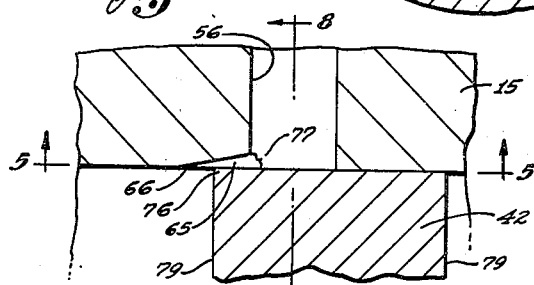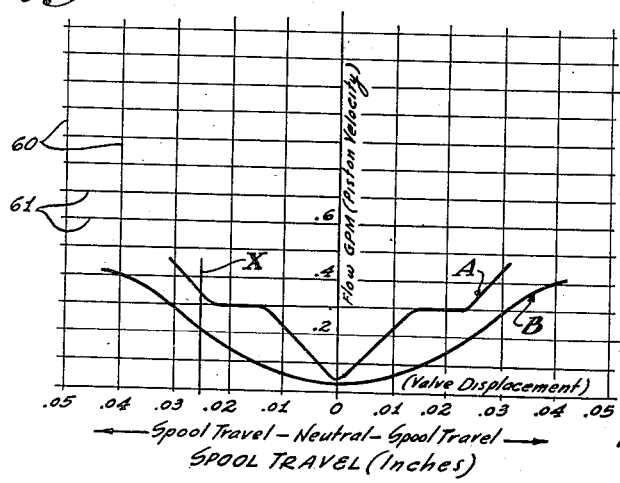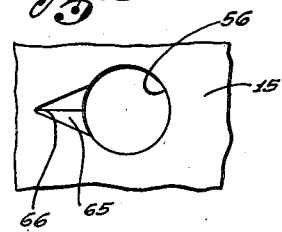
INVENTORS:
John R. Clifton
Warde L. Parker United States Patent Office 2,822,783
Patented Feb. 11, 1958

HYDRAULIC SERVO CONTROL VALVE

John R. Clifton, Rolling Hills, and Warde L. Parker, Los Angeles, Calif., assignors to Northrop Aircraft, Inc., Hawthorne, Calif., a corporation of California Application December 16, 1955, Serial No. 553,477

4 Claims. (Cl. 121—46.5)

The present invention relates to improved means for metering fluid through a hydraulic control valve, and is a continuation-in-part of application Serial No. 221,222, filed April 16, 1951, now abandoned.

The present invention embodies improvements in the general type of hydraulic servo control valve exemplified in U. S. Pat. No. 2,675,679 dated April 20, 1954, to W. L. Parker, and more specifically to the hydraulic valve claimed in U. S. Pat. No. 2,612,872 dated October 7, 1952 to C. A. Strayer, for use in irreversible full-power control systems for aircraft such as the control system claimed in U. S. Pat. No. 2,640,466 dated June 2, 1953, to T. A. Feeney, which type of system is in use in the Northrop F-89 Scorpion, U. S. A. F. fighter aircraft.

In the latter mentioned full-power flight control system, hydraulic fluid under constant pressure is directed to one side or the other of the piston in a hydraulic actuating cylinder connected to move a control surface in accordance with the relative displacement of a valve spool mounted in a fixed sleeve incased in the valve housing of the control valve as the spool is displaced in response to control by the aircraft pilot.

In the Strayer patent, for example, two sets of extremely small flow metering holes are provided in the valve sleeve, spirally arranged and spaced in such a manner as to meter fluid to and from the hydraulic actuating cylinder with a high degree of accuracy, and at a desired rate, as the valve spool is moved from neutral position in response to control by the pilot. The valve spool is normally provided with a number of plug elements or sharp edged lands adapted to serially block and unblock certain portions of the flow hole sets upon displacement of the spool from neutral, to control the flow of fluid through the valve.

The above valve is specifically designed to provide a predetermined balanced leakage or restricted flow to both sides of the piston in a hydraulic cylinder, when the valve spool is in neutral position, to preload the actuating cylinder piston by balanced fluid pressure thereby locking the actuating cylinder and connected control surface in any static position against normal airloads when the aircraft is in flight. There is complete control of fluid the instant the valve spool moves away from the neutral position. That is, one cylinder supply port is always totally closed upon displacement of the spool away from the neutral position in either direction. Inasmuch as the amount of travel of the spool, relative to the valve casing, for complete control of a surface in either directtion is usually quite small, being but .003 inch in one particular embodiment, it is apparent that even the very slightest movement of the control surface, i. e. of the actuating cylinder and valve casing, under air shock conditions, will be instantaneously prevented due to the complete closing off of the port connection to the return line, which will prevent discharge of fluid from one end of the actuating cylinder as required for movement of the piston therein. Thus through accurate metering of hydraulic fluid to and from the actuating cylinder by the control valve, rate response as well as direction is provided in an airplane control system wherein the aircraft attitude control surfaces are moved under full power in response to pilot initiated signals.

Current high speed aircraft, such as the Northrop F-89 airplane mentioned above, require minimum weight, compact, constant pressure hydraulic systems running as high as 3,000 p. s. i. The fluid metering holes in the control valve of such a system normally run about .013 inch to .015 inch in diameter with the outermost or marginal holes of each set being substantially bisected by the edges of the spool plugs to provide approximately 1500 p. s. i. preload on each side of the piston.

As the valve spool is moved from neutral position, the rate of fluid flow from a constant pressure source into and out of the actuating cylinder is generally expressed by the term "piston velocity," and the term "gain" as used herein is defined as meaning the ratio of valve displacement, i. e. travel distance of the valve away from neutral, to the rate of flow (piston velocity) to the actuating cylinder.

It has been found in the actual operation of high speed airplanes such as the Northrop F-89, that near the neutral position of the control valve, gain should be very low so that small control stick movements by the pilot will not cause a fast responsive action of the surface but that large stick movements will do so. In other words, if the system response near neutral is too rapid, such response at high speed can cause the airplane to go into a steep climb or dive, due to unintentional stick movement by the pilot and can well be disastrous. A low gain near the neutral position of the valve, on the other hand will effectively reduce control stick sensitivity and prevent servo system instability. It is, however, desirable to have high gain in the range of valve movement beyond neutral so that fast response can be had for large stick movements when desired.

The ideal gain in a control system such as has been described above is now known, and can be accurately expressed in a co-ordinate diagram as will be shown later.

The greatest difficulty in achieving the ideal gain lies in manufacturing limitations wherein practical and economic fabrication considerations prohibit the size of the already minute valve metering flow holes controlling the fluid at or near neutral from being made any smaller to provide the gain near neutral that is low enough to provide a desired low stick-sensitivity which is so vitally important in high speed airplanes. Furthermore, flow holes under .013 inch in diameter are extremely difficult to filter and the danger of clogging is therefore increased.

Since it is not practically feasible to reduce the size of neutral metering flow holes in the valve below .013 inch in diameter, attempts have been made to obtain the desired low gain near neutral by means of auxiliary devices built into the valve to bypass a portion of the fluid flow in the neutral range of the valve. This measure, however, has a distinct disadvantage in that such bypass devices tend also to lower gain in the range beyond the neutral range of valve travel where the gain should be high.

It is therefore an object of the invention to provide a simple inexpensive means of controlling the gain in a high pressure hydraulic system having a hydraulic actuating cylinder controlled by a valve.

It is another object of the invention to provide a highly restricted but accurately controlled fluid flow rate at or near the neutral position of a hydraulic valve controlling a hydraulic motor, without effecting the desired high gain at control valve positions beyond the range of neutral.

And it is a further object of the invention to provide a means for accurately reducing the gain in a valve without appreciable modification of the valve structure itself.

Briefly, in one preferred embodiment, the present invention takes the form of noncircular flow metering means associated with the circular flow metering holes, in the neutral-leakage type valve characterized above, positioned to provide a uniform low gain to a hydraulic cylinder in either direction of movement of the valve spool within the neutral range of valve movement, and which becomes inoperative in the range of valve movement beyond the neutral range so that a relatively high gain is provided for the balance of the valve operating range.

A better understanding of the present invention will be had by referring to the drawings wherein:

Figure 1 is a longitudinal sectional view showing the internal construction of a valve assembly embodying the present invention.

Figure 2 is an enlarged elevation view of the valve sleeve, partly in longitudinal section, showing the flow hole arrangement therein.

Figure 3 is a coordinate diagram showing flow in decimal fractions of one gallon per minute plotted against spool displacement from neutral in the valve of the present invention as compared with a prior valve.

Figure 4 is a magnified fragmentary side elevation view showing the relationship of the noncircular flow passage, circular metering hole, and spool land of the present invention.

Figure 5 shows a magnified fragmentary plan view taken on line 5—5 of Figure 4.

Figure 6 is a magnified fragmentary view showing one preferred means of forming the noncircular flow passage of Figure 4.

Figure 7 is a magnified fragmentary view taken on line 7—7 of Figure 6.

Figure 8 is a magnified fragmentary view taken on line 8—8 of Figure 4.

Figure 1 shows a control valve for controlling the flow of fluid from a constant pressure source to a conventional hydraulic cylinder which is in turn connected to operate an aircraft attitude control surface. It is not deemed necessary to show the actuating cylinder and control aircraft herein. The valve housing 10 is provided with a hydraulic fluid pressure inlet 11 and a fluid return port 12. The valve assembly 14, one end of which protrudes from the valve housing 10, comprises a valve sleeve 15 secured in the valve housing 10 between an end assembly 16 having a retaining shoulder 17, and a threaded plug 19, and a valve spool 20 slidably fitted within the sleeve 15 and movable by a pilot operated rod (also not shown) attached to the valve clevis 21.

The inner terminus of end assembly 16 is provided with opposed end assembly ports 22 entering a return chamber 24 which is separated from the outside by a partition 25 to the clevis 21, in turn connected to the valve operating rod. The clevis 21 is held to limited travel by a clevis pin 27 attached to end assembly 16 and passes through an elongated hole 29 in the clevis 21. A spool rod packing 30 is installed in the partition 25 to prevent external leakage. The spool rod 26 is attached by a spool pin 31 to the valve spool 20.

The threaded plug 19 at the right end of the valve assembly is provided with a threaded end return fluid chamber 32 connecting with the left end return chamber 24 by threaded end ports 34 in the spool 20 through a central spool bore 35 and clevis end ports 36. The ports 36 communicate directly with clevis end return chamber 24 and end assembly ports 22. The threaded plug 19 is also provided with opposed plug ports 37 which may be connected to an additional outside return passage O as will be discussed later.

Both ends of the spool 20 are exactly alike, the spool 20 being attached at the threaded end 19 to a spool idler rod 38 by an idler pin 39. The idler rod 38 passes through the threaded plug 19 and is sealed by an idler rod packing 40 mounted in the plug 19.

The exterior of the cylindrical valve spool 20 carries two balancing lands 41 located one near each end just adjacent each end of the spool 20. A metering land 42 follows each balancing land 41 on the inward side thereof. Between each metering land 42 and its adjacent balancing land 41 is provided a ring of spool return passages 43 which connect with the central spool bore 35. The diameter of the spool at all of the spool lands is the same, being lapped carefully to match the inner diameter of the sleeve 15, which is perfectly straight without grooves or projections.

On the external surface of the valve sleeve 15, as shown in Figures 1 and 2, at each end thereof, a peripheral groove 44 is provided to retain packing and ring seals 46.

Inwardly of the seal grooves 44 and at each end thereof the sleeve 15 is provided with fluid grooves 47, each having a set of metering holes 49 therein communicating with the interior of the sleeve 15, as will be described in detail later in this specification. Another inner ring seal and packing 50 on each side follows on the sleeve 15, sealing pressure fluid groove 51 which is in communication with the interior of the sleeve 15 through pressure passages 52. The outer pressure fluid groove 51 connects directly with the pressure inlet 11 in the housing 10.

In the housing 10 opposite each of the two fluid grooves 47, fluid passages 54 and 55 connect respectively to opposite ends of the actuating cylinder.

The general operation of the valve assembly is now apparent. In Figure 1, the spool 20 is shown in the neutral position. Fluid under pressure is present around the center of the spool 20 between the metering lands 42. As the spool 20 is progressively displaced to the left, for example, fluid is admitted at an increasing rate through the left set of metering holes 49 in the sleeve 15 to the first cylinder groove 47 and thence through its respective fluid passage 54 to one end of the actuating cylinder to move the enclosed piston. At the same time, fluid from the other end of the cylinder returns through the other fluid passage 55 and the right set of metering holes 49 to the right-end spool return passages 34 and out the additional return port O. Return fluid thus enters the central spool bore 35 and reaches the housing return bore 12 through the spool end ports 36 and end assembly ports 22, at the left end of the assembly 14.

When the spool 20 is moved to the right side of neutral, the flow is reversed through the metering holes 49 and fluid passages 54 and 55, and return fluid enters the central spool bore 35 through the left set of metering holes 49 and spool return passages 43 to be returned through the housing return bore 12.

The gain produced in the above valve, as the spool is displaced from neutral, is most aptly described in the coordinate diagram of Figure 3 wherein vertical ordinates 60 represent spool travel in decimal fractions of one inch, and horizontal ordinates 61 represent decimal fractions of one gallon per minute of flow as the valve delivers fluid to one side or the other of the piston in the hydraulic cylinder.

Curve A shows the increase in flow rate as the above described valve is operated. It will be noted that curve A rises relatively steeply as the valve is displaced about .015 from neutral; the G. P. M. of flow increasing from less than 0.1 G. P. M. of flow at the neutral position, to 0.3 G. P. M. as the first circular metering hole is totally uncovered. The actual critical range of valve spool displacement is adjudged to be from neutral (0) to slightly beyond .02 inch as indicated by the short ordinate X, and within this range the ideal curve should approximate curve B wherein it can be clearly seen that the curve is relatively shallow and gradually rounded, indicating that the gain is relatively low as contrasted with the steepness of curve A which, by comparison, indicates that the gain is relatively high. It has been established that the low gain represented by curve B has proven most satisfactory from the standpoint of stick-sensitivity and system stability requirements in a high speed aircraft full power control system such as the one described above.

As before stated, it is not practically feasible in the present state of the art to reduce the diameter of the initial or first circular flow holes, and the degree to which flow can be practically restricted, as a circular hole is uncovered by the spool land, is definitely limited. So much so that curve A represents the best results which can be obtained with a circular opening thus far.

In the valve of the present invention, as best shown in Figure 2, each flow hole arrangement comprises six substantially circular flow holes 49 radially located through the sleeve 15 at evenly spaced distances around the circumference thereof. Each flow hole 49 preferably consists of a small diameter portion 56 opening into the interior of the sleeve 15 and a larger diameter portion 57 opening into the cylinder groove 47 in the exterior of the sleeve. The flow holes 49 of each set are staggered in the lengthwise direction on the sleeve 15 to provide a predetermined relationship between spool travel and change of flow rate. When the spool 20 and sleeve 15 are in their relative neutral position as in Figure 1, all of the circular flow metering holes 49 of each set are entirely covered by the valve spool lands 42 instead of having the edges of the spool lands bisecting the end holes 49a for neutral leakage to the actuating cylinder piston as in the case of the prior valves, such as the valve of U. S. Patent No. 2,612,872, supra, whose performance approximates curve A of Figure 3.

To obtain the required balanced and highly restricted neutral flow for preloading both sides of the piston in the actuating cylinder, and further obtain the ideal low gain in the neutral range of valve movement and the desired high gain beyond the neutral range of valve movement as illustrated in curve B of Figure 3, noncircular flow passages 65 are provided ahead of the circular flow metering hole sets and connected therewith, at both extremities or ends thereof.

In order to more precisely control and restrict the change in flow rate, and obtain the desired low gain in the neutral range of valve movement, the noncircular flow passages 65 at each end of the flow metering hole 49 sets can be somewhat wedge shaped, as more clearly shown in the enlarged views of Figures 4 and 5, in that the sides of the passage converge at one end thereof to form an apex 66 at the outer extremity thereof, and extend from the apex 66 toward the marginal or first metering hole 49, diverging to intersect and open directly into the circular metering flow hole at the other end thereof.

To accurately position the low gain neutral flow passage 65 with respect to the circular flow metering hole 49 sets, the outer or marginal circular flow holes 49a can be used to index the tool employed for producing the low gain neutral leakage flow passages 65 in the valve sleeve 15 before hardening, i. e. while the material from which the sleeve is made is in an annealed state. As shown in Figure 6, a coining or impact type of tool 70 is provided with a pilot member 71 of circular cross-section extending perpendicularly from the tool shank 72. The pilot member is sized to exactly fit the small portion 56 of the metering flow hole 49a and retain the pilot firmly in place. Near the base of the pilot member 71, an appropriately shaped indenting member 74 is provided on pilot member 71. When the tool 70 is properly guided by pilot member 71, is moved upwardly with sufficient force against the interior of the sleeve 15, which is of course firmly supported, the non-circular passage 65 is formed in the interior surface of the sleeve 15 by penetration of the indenting member 74 into sleeve material.

The indenting member 74 is preferably wedge shaped in cross-section, as shown in Figure 7, thus the indented passage 65 will appear as shown in the sectional view of Figure 8.

It is found that in the low gain passage 65 with the wedge shaped cross-section, as best shown in Figures 4, 5, and 8, a desirable double effect is provided in the pressure drop of fluid flowing therethrough at the neutral position of the valve, which pressure drop contributes considerably to the low gain achieved with the valve of the present invention. It is believed that this double effect pressure drop is achieved when fluid passes first through the opening defined between the edge 76 of the spool land 42 and apex 66 of passage 65, and then when the fluid enters the circular metering hole 49a through the opening 77 defined at the inner end of passage 65. It was found that this double effect, however, cannot be achieved in flow passing through a straight through hole, i. e., the double effect pressure drop is only present in the neutral range of valve movement wherein the noncircular passage is being uncovered and disappears as the remaining circular flow metering holes are uncovered beyond the neutral range of valve movement. Thus an unexpected degree of flow restriction is had by way of the noncircular passage 65.

The actual dimensions of the noncircular passage 65 are governed entirely by the dictates of the particular flow curve desired in the present example, curve B of Figure 3, and while certain dimensions can be arbitrarily assigned to the passage with reasonable accuracy, the final dimensions are best arrived at by actual flow measurement and pressure readings of the valve plotted against the ideal curve B.

For example, the edges 77 of spool lands 42 as shown in Figure 4, extend over the major portion of the passages 65, leaving a minor portion intermediate the apex 66 thereof and the edge 77 of the metering land 42 open at neutral position to permit the highly restricted balanced flow into and out of the hydraulic cylinder. The flow rate at neutral must be balanced carefully so as to be substantially exactly equal at each end of the flow hole sets. Furthermore a preload pressure of approximately 1500 p. s. i. is preferably established in the present example. The final adjustments are most easily accomplished by grinding the faces 79 of the spool lands to final dimensions rather than alteration of the passage 65 dimensions.

It will be apparent to those skilled in the art, from the foregoing description, that the depth of the passage 65 as well as the other dimensions, can be altered to obtain the type of flow curve desired, in other systems, in accordance with the performance required in such systems. It may be here noted that with the .013 inch diameter circular metering holes of the valve described herein, a noncircular passage measuring .017 inch from the apex 66 thereof to the center of the circular metering hole 49a produced a flow conforming substantially to curve B of Figure 3. The maximum width of the passage 65, at opening 77 measured, in this particular example, approximately .007 inch, with a maximum depth of about .004 inch.

Thus it can be seen that the present invention provides a novel but simple and economical means for practically and effectively lowering gain in a high pressure hydraulic full power control system, without resort to alteration of the minute circular flow holes of the system control valve or the use of auxiliary flow by-passing devices.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A valve assembly comprising a hollow sleeve having a fluid pressure inlet therethrough, a fluid outlet, and two cylinder passages adapted to be connected one with each side of a piston in a cylinder, each cylinder passage being defined by a plurality of substantially circular metering holes through said sleeve around the periphery thereof, staggered and spaced apart lengthwise of said sleeve, a spool member matching the interior of said sleeve and movable within said sleeve in either direction from a neutral position, said spool comprising two metering lands contacting the interior of said sleeve and spaced apart by the same distance as said two cylinder passages, said fluid inlet communicating with one side of each metering land and said fluid outlet communicating with the other side of each metering land, said neutral position of said spool occurring where each of said metering lands covers the openings of all of the circular metering holes in each cylinder passage, and noncircular means defining a flow passage adjacent each end of said plurality of circular metering holes of each cylinder passage and associated with the end holes thereof, the edges of said metering lands covering a major portion of said noncircular means, a minor portion of said noncircular means extending beyond the edges of said spool lands at each end thereof to provide an opening to direct a highly restricted balanced flow into said end circular metering holes and thence into and out of said cylinder on either side of said piston to preload the same when said valve spool is in neutral position, said noncircular means being shaped to gradually enlarge in cross-section in a direction toward said circular metering holes to intersect and open into the endmost circular metering hole of said plurality of circular metering holes of each of said cylinder passages at each end of said spool lands.

2. A valve assembly comprising a hollow sleeve having a fluid pressure inlet therethrough, a fluid outlet, and two cylinder passages adapted to be connected one with each side of a piston in a hydraulic cylinder, each cylinder passage being defined by a plurality of circular metering holes through said sleeve around the periphery thereof staggered and spaced apart lengthwise of said sleeve, a spool member matching the interior of said sleeve and movable within said sleeve in either direction from a neutral position, said spool comprising two metering lands contacting the interior of said sleeve and spaced apart by the same distance as said two cylinder passages, said spool being movable a sufficient distance in either direction from neutral position to serially cover and uncover all of said metering holes at the maximum stroke of said spool in either direction of movement thereof, said fluid inlet communicating with one side of each metering land and said fluid outlet communicating with the other side of each metering land, said neutral position of said spool occurring where each of said metering lands covers all of said circular metering holes of each cylinder passage, and noncircular flow passages at each end of said plurality of circular metering holes of each cylinder passage, one end of said noncircular flow passages communicating with the endmost circular metering hole on each side of said plurality of circular metering holes of each cylinder passage, the other end of said noncircular passages opening beyond the edges of each of said spool lands at each end thereof to communicate with the interior of said sleeve to direct a highly restricted balanced neutral flow from said sleeve interior through said endmost circular metering holes and thence into and out of said hydraulic cylinder on either side of said piston, said noncircular flow passages gradually increasing in cross-section from the minimum area thereof beyond the edges of said spool lands at each end thereof and in the neutral position thereof, to the maximum area thereof where said noncircular passage opens into said endmost circular metering holes.

3. Apparatus according to claim 2 wherein said noncircular passages are triangularly shaped in plan having their apices positioned beyond the edges of said spool lands at each end thereof when said valve spool and valve sleeve are relatively positioned in neutral, the widest portions of said noncircular passages occurring where said passages communicate with said endmost circular metering holes of each of said cylinder passages.

4. Apparatus according to claim 3 wherein said noncircular passages are substantially triangular in cross-section.

References Cited in the file of this patent

UNITED STATES PATENTS

| | | |
|---|---|---|
| 2,612,872 | Strayer | Oct. 7, 1952 |
| 2,631,571 | Parker | Mar. 17, 1953 |
| 2,648,313 | Clifton | Aug. 11, 1953 |
| 2,702,529 | Doerfner | Feb. 22, 1955 |
| 2,706,467 | Houldsworth | Apr. 19, 1955 |